United States Patent
Nakamura et al.

(10) Patent No.: US 10,374,260 B2
(45) Date of Patent: Aug. 6, 2019

(54) CYLINDRICAL ALKALINE SECONDARY BATTERY

(71) Applicant: FDK CORPORATION, Tokyo (JP)

(72) Inventors: Tomomi Nakamura, Tokyo (JP); Hiroyuki Shibaoka, Tokyo (JP); Tetsu Yamanaka, Tokyo (JP); Isao Mugima, Tokyo (JP); Hidefumi Isaji, Tokyo (JP); Hideyuki Asanuma, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 15/698,504

(22) Filed: Sep. 7, 2017

(65) Prior Publication Data
US 2018/0069268 A1    Mar. 8, 2018

(30) Foreign Application Priority Data

Sep. 8, 2016 (JP) .................... 2016-175807
May 18, 2017 (JP) .................... 2017-099239

(51) Int. Cl.
*H01M 10/0525* (2010.01)
*H01M 10/24* (2006.01)
(Continued)

(52) U.S. Cl.
CPC ........... *H01M 10/24* (2013.01); *H01M 2/202* (2013.01); *H01M 2/263* (2013.01); *H01M 4/24* (2013.01);
(Continued)

(58) Field of Classification Search
CPC ................. H01M 10/0525; H01M 10/052
See application file for complete search history.

(56) References Cited

U.S. PATENT DOCUMENTS

| | | |
|---|---|---|
| 2009/0208830 A1 | 8/2009 | Okabe et al. |
| 2009/0233174 A1 | 9/2009 | Okabe et al. |
| 2015/0024258 A1* | 1/2015 | Sumiyama ............... H01M 2/08 429/174 |

FOREIGN PATENT DOCUMENTS

| | | |
|---|---|---|
| CA | 1042067 | * 11/1978 |
| EP | 1079449 A1 | 2/2001 |

(Continued)

OTHER PUBLICATIONS

Extended European Search Report, for European Patent Application No. 17189889.3, dated Jan. 31, 2018, 9 pages.
(Continued)

*Primary Examiner* — Olatunji A Godo
(74) *Attorney, Agent, or Firm* — Kinney & Lange, P.A.

(57) ABSTRACT

A nickel-hydrogen secondary battery includes: an outer can; a sealing body including a positive electrode terminal, the sealing body sealing an opening of the outer can; an electrode group formed by placing a positive electrode and a negative electrode on top of each other with a separator therebetween and spirally winding the positive electrode and the negative electrode, the electrode group housed in the outer can along with an alkaline electrolyte; a positive electrode current collector connected to positive electrode connection edge portion protruding from one end surface of the electrode group; and a current collecting lead connecting the positive electrode current collector and the sealing body, wherein a relationship between a deformation resistance A of a material a and a deformation resistance B of a material b satisfies a relationship of A<B, wherein the material a is a material of the current collecting lead, and the material b is a material of the positive electrode current collector.

8 Claims, 8 Drawing Sheets

(51) Int. Cl.
- *H01M 4/24* (2006.01)
- *H01M 10/28* (2006.01)
- *H01M 2/20* (2006.01)
- *H01M 2/26* (2006.01)
- *H01M 10/0587* (2010.01)

(52) U.S. Cl.
CPC ..... *H01M 10/0587* (2013.01); *H01M 10/283* (2013.01)

(56) References Cited

FOREIGN PATENT DOCUMENTS

| | | |
|---|---|---|
| EP | 2182566 A1 | 5/2010 |
| JP | H10261397 A | 9/1998 |
| JP | 2004235036 | 8/2004 |
| WO | WO2013125244 * | 8/2013 |

OTHER PUBLICATIONS

First European Office Action dated Mar. 11, 2019, received for corresponding European Application No. 171898893.

* cited by examiner

CYLINDRICAL ALKALINE SECONDARY BATTERY

BACKGROUND

Field of the Invention

The present invention relates to a cylindrical alkaline secondary battery.

Description of the Related Art

Alkaline secondary batteries are increasingly used, and batteries of a type capable of performing high-rate charge and discharge are developed. A cylindrical alkaline secondary battery as illustrated below is known as an example of the batteries.

The cylindrical alkaline secondary battery is formed by housing an electrode group in a bottomed cylindrical outer can along with an alkaline electrolyte and sealing an opening portion of the outer can by a sealing body including a positive electrode terminal.

The electrode group is formed by spirally winding a positive electrode and a negative electrode placed on top of each other with a separator interposed between the positive electrode and the negative electrode, and the electrode group is substantially columnar as a whole. In the winding operation, the positive electrode and the negative electrode are slightly shifted from each other in a direction along an axis of the electrode group, and the separator in a predetermined size are arranged at predetermined positions between the positive electrode and the negative electrode. In this state, the positive electrode, the separator, and the negative electrode are wound around. As a result, an end edge portion of the positive electrode spirally protrude from one end surface side of the electrode group, and an end edge portion of the negative electrode spirally protrude from the other end surface side of the electrode group.

A positive electrode current collector is welded to the protruding positive electrode end edge portion, and a negative electrode current collector is welded to the protruding negative electrode end edge portion. In this way, the positive electrode current collector is electrically connected to the positive electrode across a wide range, and the negative electrode current collector is electrically connected to the negative electrode across a wide range. This increases the current collection efficiency. As a result, high-rate charge and discharge can be performed in the battery.

To assemble the cylindrical alkaline secondary battery, the electrode group is first inserted into the outer can, and a bottom wall inner surface of the outer can and the negative electrode current collector are welded, for example. As a result, the outer can, which also serves as a negative electrode terminal, and the negative electrode are electrically connected. Next, one end of a positive electrode ribbon made of a metallic thin plate is welded to a predetermined position of the positive electrode current collector. The other end of the positive electrode ribbon is further welded to a predetermined position of the sealing body. As a result, the positive electrode terminal and the positive electrode are electrically connected. Subsequently, the sealing body is mounted on an upper end opening portion of the outer can via an insulating gasket, and the upper end opening portion of the outer can is caulked to seal the outer can. As a result, the cylindrical alkaline secondary battery is formed.

The positive electrode ribbon is relatively long to facilitate welding to the sealing body. The positive electrode ribbon is bent and housed between the sealing body and the electrode group in the outer can when the sealing body is mounted on the upper end opening portion of the outer can. Therefore, the positive electrode ribbon is relatively thin to facilitate bending.

In recent years, higher performance is desired for the alkaline secondary batteries, and particularly, further improvement in the high-rate discharge characteristics is desired to allow efficiently outputting a large current.

To improve the high-rate discharge characteristics, the internal resistance of the battery needs to be as low as possible. However, when the thin and long strip-shaped positive electrode ribbon is used, the resistivity of the positive electrode ribbon is high, and the positive electrode ribbon increases the internal resistance of the battery.

Therefore, various examinations for shortening conventional energization paths are conducted to further reduce the internal resistance of the battery and to obtain a battery with excellent high-rate discharge characteristics. A battery as illustrated in Japanese Patent No. 3547931 (also published as Japanese Patent Publication No. H10261397, hereinafter, referred to as Patent Literature 1) is known as an example of the battery in which measures for shortening the energization paths are taken.

A current collecting lead thicker and shorter than the conventional positive electrode ribbon is used in a battery represented by the battery of Patent Literature 1. More specifically, a current collecting lead in a predetermined shape as shown in FIG. 1 and the like of Patent Literature 1 is welded on a positive electrode current collector when the battery of Patent Literature 1 is assembled. Next, a sealing body is arranged on an opening portion of an outer can via an insulating gasket, and an opening end edge of the outer can is caulked inward to seal the battery to thereby assemble the battery. At the time of the sealing, the current collecting lead and the sealing body are in contact with each other. Subsequently, electricity is applied between a positive electrode terminal and a negative electrode terminal of the battery to perform resistance spot welding of the current collecting lead of the positive electrode and the sealing body.

The battery of Patent Literature 1 allows to weld the current collecting lead and the sealing body after the outer can is sealed, and the current collecting lead and the sealing body do not have to be welded before the outer can is sealed. As a result, the sealing body can be easily mounted on the opening portion of the outer can even when the current collecting lead is short. In this way, the short current collecting lead can shorten the energization paths, and the internal resistance of the battery can be reduced. In the battery of Patent Literature 1, the current collecting lead does not have to be bent in the outer can, and a thick current collecting lead can be used. In this way, the thick current collecting lead can thicken the energization paths, and this can also reduce the internal resistance of the battery.

In this way, the internal resistance of the battery of Patent Literature 1 is lower than the internal resistance of the conventional battery, and the battery of Patent Literature 1 has excellent high-rate discharge characteristics.

When the upper end opening edge of the outer can is caulked to mount the sealing body on the outer can or when the resistance spot welding is applied to the current collector, the current collecting lead, and the sealing body, the battery is subjected to a compressive stress in the axial direction of the battery. When the compressive stress is applied, the current collector is deformed, and the electrode group is compressed. Consequently, the end portions of the positive electrode and the negative electrode of the electrode group may be bent in the battery, and an internal short circuit may occur.

SUMMARY

A cylindrical alkaline secondary battery includes: a bottomed cylindrical outer can including a negative electrode terminal; a sealing body including a positive electrode terminal, the sealing body sealing an upper end opening of the outer can; a columnar electrode group formed by placing a positive electrode and a negative electrode on top of each other with a separator therebetween and spirally winding the positive electrode and the negative electrode, the electrode group housed in the outer can along with an alkaline electrolyte; a current collector connected to an end edge portion of the positive electrode protruding from one end surface of the electrode group; and a current collecting lead connecting the current collector and the sealing body, wherein a relationship between a deformation resistance A of a material a and a deformation resistance B of a material b satisfies a relationship of A<B, wherein the material a is a material of the current collecting lead, and the material b is a material of the current collector.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION

An alkaline secondary battery according to embodiments of the present invention will now be described with reference to the drawings.

An AA size cylindrical nickel-hydrogen secondary battery (hereinafter, referred to as a battery) 1 shown in FIG. 1 will be described as an example of an alkaline secondary battery according to an embodiment of the present invention.

The battery 1 includes a bottomed cylindrical outer can 2 with an open upper end. The outer can 2 is conductive, and a bottom wall of the outer can 2 functions as a negative electrode terminal. An electrode group 4 is housed in the outer can 2 along with a predetermined amount of alkaline electrolyte (not shown).

Figure 1:
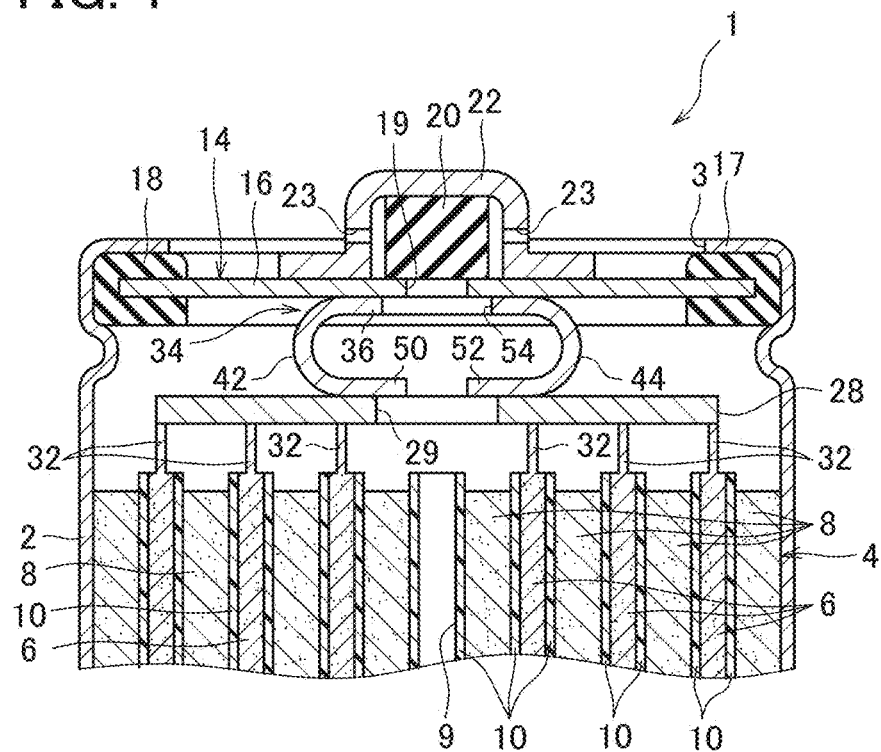
FIG. 1 is a partial cross-sectional view showing a cylindrical nickel-hydrogen secondary battery according to an embodiment of the present invention.

As shown in FIG. 1, an opening 3 of the outer can 2 is closed by a sealing body 14. The sealing body 14 includes: a conductive disc-shaped cover plate 16; and a valve body 20 and a positive electrode terminal 22 disposed on the cover plate 16. A ring-shaped insulating gasket 18 is arranged on an outer peripheral part of the cover plate 16 so as to surround the cover plate 16, and the insulating gasket 18 and the cover plate 16 are fixed to an opening edge 17 of the outer can 2 by caulking the opening edge 17 of the outer can 2. Therefore, the cover plate 16 and the insulating gasket 18 cooperate to seal the opening 3 of the outer can 2. The cover plate 16 includes a center through hole 19 at the center, and a valve body 20 made of rubber is arranged on an outer surface of the cover plate 16 so as to close the center through hole 19. The cylindrical positive electrode terminal 22 with a flange is electrically connected on the outer surface of the cover plate 16 so as to cover the valve body 20. The positive electrode terminal 22 presses the valve body 20 toward the cover plate 16. The positive electrode terminal 22 includes gas release holes 23 on a side surface.

At a normal time, the center through hole 19 is airtightly closed by the valve body 20. On the other hand, when an internal pressure increases due to a gas generated in the outer can 2, the internal pressure compresses the valve body 20 and opens the center through hole 19. As a result, the gas is released from the inside of the outer can 2 to the outside via the center through hole 19 and the gas release holes 23 of the positive electrode terminal 22. Therefore, the center through hole 19, the valve body 20, and the gas release holes 23 of the positive electrode terminal 22 form a safety valve for the battery 1.

The electrode group 4 includes strip-shaped a positive electrode 6, a negative electrode 8, and a separator 10 which are spirally wound with the separator 10 being placed between the positive electrode 6 and the negative electrode 8. Therefore, the positive electrode 6 and the negative electrode 8 are placed on top of each other with the separator 10 therebetween. The electrode group 4 is columnar as a whole.

In the electrode group 4, an end edge portion of the positive electrode 6 is spirally exposed from one of end surfaces, and an end edge portion of the negative electrode 8 is spirally exposed from the other end surface. Here, the exposed end edge portion of the positive electrode 6 will be referred to as a positive electrode connection edge portion 32, and the exposed end edge portion of the negative electrode 8 will be referred to as a negative electrode connection edge portion (not shown). A positive electrode current collector 28 described later and a negative electrode current collector (not shown) are welded to the exposed positive electrode connection edge portion 32 and negative electrode connection edge portion, respectively.

The negative electrode 8 include a strip-shaped conductive negative electrode core, and the negative electrode core hold a negative electrode mixture.

The negative electrode core is made of strip-shaped metal, in which a large number of through holes (not shown) penetrating in a thickness direction of the negative electrode core are distributed. An example of the negative electrode core includes a punching metal sheet.

The negative electrode mixture is provided not only in the through holes of the negative electrode core, but is also laminated and held on both surfaces of the negative electrode core.

The negative electrode mixture contains particles of a hydrogen storage alloy, a conductive material, a binding agent, and the like. The hydrogen storage alloy here is an alloy capable of storing and releasing hydrogen that is a negative electrode active material, and a hydrogen storage alloy generally used for a nickel-hydrogen secondary battery is suitably used. The binding agent binds the particles of the hydrogen storage alloy and the conductive material with each other and binds the negative electrode mixture to the negative electrode core at the same time. Here, a conductive material and a binding agent generally used for the nickel-hydrogen secondary battery are suitably used.

The negative electrode 8 can be manufactured, for example, as follows.

First, hydrogen storage alloy powder as a mass of the hydrogen storage alloy particles, the conductive material, the binding agent, and water are kneaded to prepare a paste of the negative electrode mixture. The obtained paste of the negative electrode mixture is coated on the negative electrode core and dried. After drying, the negative electrode core provided with the negative electrode mixture containing the hydrogen storage alloy particles and the like is rolled and cut, and an intermediate product of the negative electrode is obtained. The intermediate product of the negative electrode is rectangular as a whole. In the intermediate product of the negative electrode, the negative electrode mixture is removed from a predetermined end edge portion that will be the negative electrode connection edge portion. As a result, the predetermined end edge portion become the negative electrode connection edge portion with uncovered negative electrode core. In this way, the negative electrode 8 including the negative electrode connection edge portion is obtained. The method of removing the negative electrode mixture is not particularly limited here, and for example, ultrasonic vibration is suitably applied to remove the negative electrode mixture. The negative electrode mixture is maintained in regions other than the negative electrode connection edge portion.

Next, the positive electrode 6 will be described.

The positive electrode 6 include: a conductive positive electrode base material having a porous structure and including a large number of holes; and a positive electrode mixture held in the holes and on the surface of the positive electrode base material.

An example of the positive electrode base material includes nickel foam.

The positive electrode mixture contains nickel hydroxide particles as positive electrode active material particles, a cobalt compound as a conductive material, a binding agent, and the like. The binding agent binds the nickel hydroxide particles and the conductive material with each other and binds the positive electrode mixture to the positive electrode base material at the same time. Here, a binding agent generally used for the nickel-hydrogen secondary battery is suitably used.

The positive electrode 6 can be manufactured, for example, as follows.

First, a positive electrode mixture slurry containing positive electrode active material powder as a mass of the positive electrode active material particles, the conductive material, water, and the binding agent is prepared. The obtained positive electrode mixture slurry is provided to, for example, nickel foam and dried. After drying, the nickel foam filled with the nickel hydroxide particles and the like is rolled and cut into a predetermined shape, and an intermediate product of the positive electrode is obtained. The intermediate product of the positive electrode is rectangular as a whole. In the intermediate product of the positive electrode, the positive electrode mixture is removed from a predetermined end edge portion that will be the positive electrode connection edge portion 32, and the positive electrode base material is uncovered. Next, the end edge portion from which the positive electrode mixture is removed is compressed in the thickness direction of the intermediate product of the positive electrode, and the end edge portion become the positive electrode connection edge portion 32. The positive electrode base material becomes dense as a result of the compression, and the positive electrode connection edge portion 32 can be easily welded. In this way, the positive electrode 6 including the positive electrode connection edge portion 32 is obtained. The method of removing the positive electrode mixture is not particularly limited here, and for example, ultrasonic vibration is suitably applied to remove the positive electrode mixture. The positive electrode mixture is maintained in regions other than the positive electrode connection edge portion 32.

Next, the separator 10 can be provided by, for example, applying a hydrophilic functional group to polyamide non-woven fabric or applying a hydrophilic functional group to polyolefin non-woven fabric such as polyethylene and polypropylene.

The positive electrode 6 and the negative electrode 8 manufactured as described above are spirally wound with the separator 10 being interposed between the positive electrode 6 and the negative electrode 8, and the electrode group 4 is formed. More specifically, in the winding, the positive electrode 6 and the negative electrode 8 are slightly shifted from each other in a direction along an axial direction of the electrode group 4, and the separator 10 in a predetermined size are arranged at predetermined positions between the positive electrode 6 and the negative electrode 8. The winding operation is performed in this state. As a result, the columnar electrode group 4 is obtained. In the obtained electrode group 4, the positive electrode connection edge portion 32 of the positive electrode 6 protrude more than the negative electrode 8 adjacent to the positive electrode 6 across the separator 10, on one end side of the electrode group 4. The negative electrode connection edge portion of the negative electrode 8 protrude more than the positive electrode 6 adjacent to the negative electrode 8 across the separator 10, on the other end side of the electrode group 4.

The electrode group 4 is formed by winding the positive electrode 6, the negative electrode 8, and the separator 10 around a winding core in a predetermined outer diameter dimension, and the winding core is pulled out after the winding operation. Therefore, a through hole 9 is formed at the center of the electrode group 4.

In the electrode group 4, the positive electrode current collector 28 is connected to one end side, and the negative electrode current collector is connected to the other end side.

The negative electrode current collector is not particularly limited, and for example, a conventionally used disc-shaped metal plate can be preferably used. The prepared negative electrode current collector is welded to the negative electrode connection edge portion on the other end side of the electrode group 4.

Next, the positive electrode current collector 28 will be described.

The positive electrode current collector 28 is a plate-like body made of a conductive material, and the shape in plan view is not particularly limited. The positive electrode current collector 28 can have an arbitrary shape, such as a disc shape and a polygonal shape. The size of the positive electrode current collector 28 is smaller than the outer diameter dimension of the electrode group 4, and the size is set to allow covering the positive electrode connection edge portion 32 of the positive electrode 6 protruding from one end side of the electrode group 4.

Figure 2:
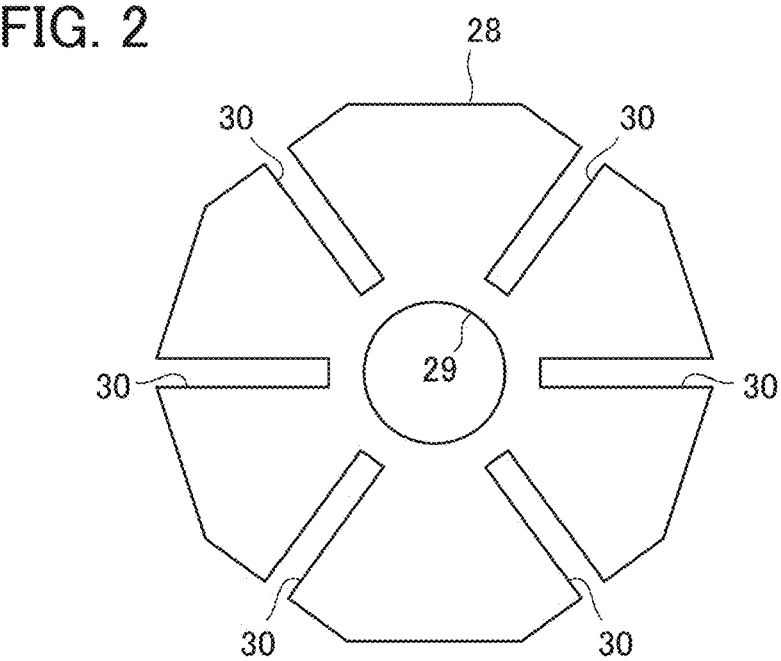
FIG. 2 is a plan view shown a positive electrode current collector.

In the present embodiment, a plate material decagonal in plan view is used as illustrated in FIG. 2. More specifically, the positive electrode current collector 28 is a thin plate decagonal as a whole and made of Ni-plated steel. The positive electrode current collector 28 includes: a circular center through hole 29 at the center; and six slits 30 radially extending around the center through hole 29. It is preferable to form the slits 30 by punching to generate projections (burrs) extending downward (toward the electrode group 4) at edge parts of the slits 30.

In the battery 1, a current collecting lead 34 is interposed between the positive electrode current collector 28 and the sealing body 14 as shown in FIG. 1, and the current collecting lead 34 electrically connects the positive electrode current collector 28 connected to the positive electrode 6 of the electrode group 4 and the sealing body 14 including the positive electrode terminal 22.

Figure 3:
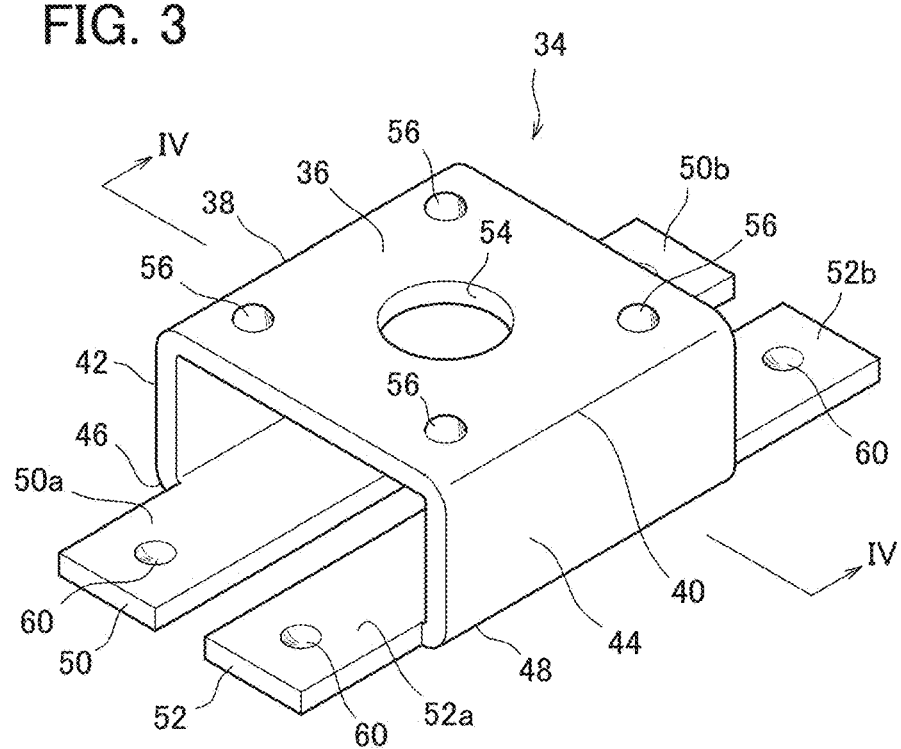
FIG. 3 is a perspective view showing a current collecting lead.

As illustrated for example in FIG. 3, the current collecting lead 34 includes: a substantially rectangular top wall portion 36 connected to the sealing body 14; a pair of side wall portions 42 and 44 extending from predetermined side edges 38 and 40 of the top wall portion 36; and leg portions 50 and 52 extending from end edges 46 and 48 on the opposite side of the top wall portion 36 in the side wall portions 42 and 44, the leg portions 50 and 52 being connected to the positive electrode current collector 28.

The top wall portion 36 is provided with a circular through hole 54 at the center. The through hole 54 communicates with the center through hole 19 of the cover plate 16 when the current collecting lead 34 is connected to the sealing body 14. Four projection portions 56 serving as welded portions are provided around the through hole 54.

Figure 4:
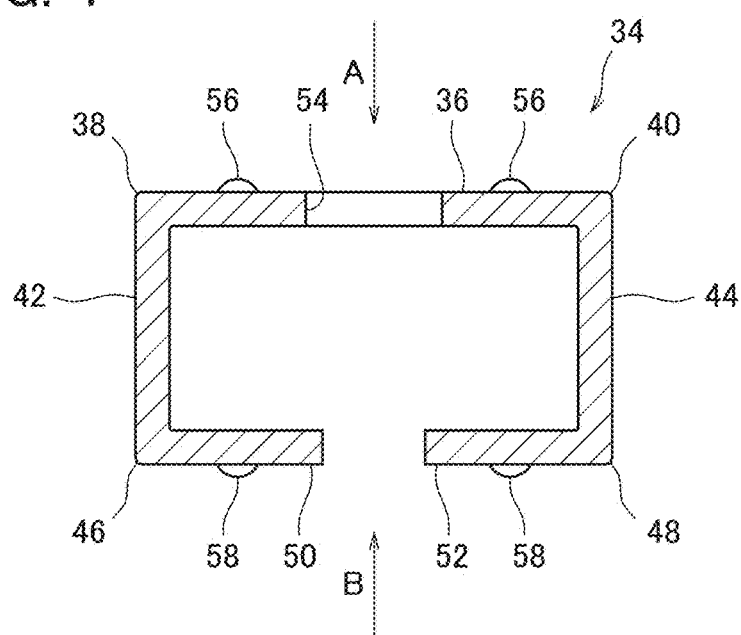
FIG. 4 is a cross-sectional view along a line IV-IV in FIG. 3.

The side wall portions 42 and 44 extend from the side edges 38 and 40 of the top wall portion 36, and the cross-sectional shape is substantially straight as shown in FIG. 4. Here, the length of the side wall portions 42 and 44 in the up and down direction of FIG. 4, that is, the length in the direction of extension from the top wall portion 36 to the leg portions 50 and 52, is set to a length equivalent to the length between the sealing body 14 and the positive electrode current collector 28. As a result, the energization paths can be shortened, and this contributes to a reduction in the internal resistance of the battery.

The leg portions 50 and 52 extend from the end edges 46 and 48 of the side wall portions 42 and 44 and are positioned to face the top wall portion 36. The leg portions 50 and 52 include extension portions 50a, 50b, 52a, and 52b extending in a direction along the longitudinal direction of the side wall portions 42 and 44 as shown in FIG. 3. The extension portions 50a, 50b, 52a, and 52b extend outward from positions facing the top wall portion 36, and this increases the stability of the current collecting lead 34 when the current collecting lead 34 is connected to the positive electrode current collector 28. The extension portions 50a, 50b, 52a, and 52b are provided with projection portions 58 protruding toward the positive electrode current collector 28 (see FIG. 4). The projection portions 58 also serve as welded portions.

Here, the projection portions 56 and the projection portions 58 are formed by, for example, pressing. Note that reference sign 60 in FIG. 3 indicates concave portions generated on the back side of the projection portions 58 when the projection portions 58 are provided on the leg portions 50 and 52.

The current collecting lead 34 can be manufactured, for example, as follows.

Figure 5:
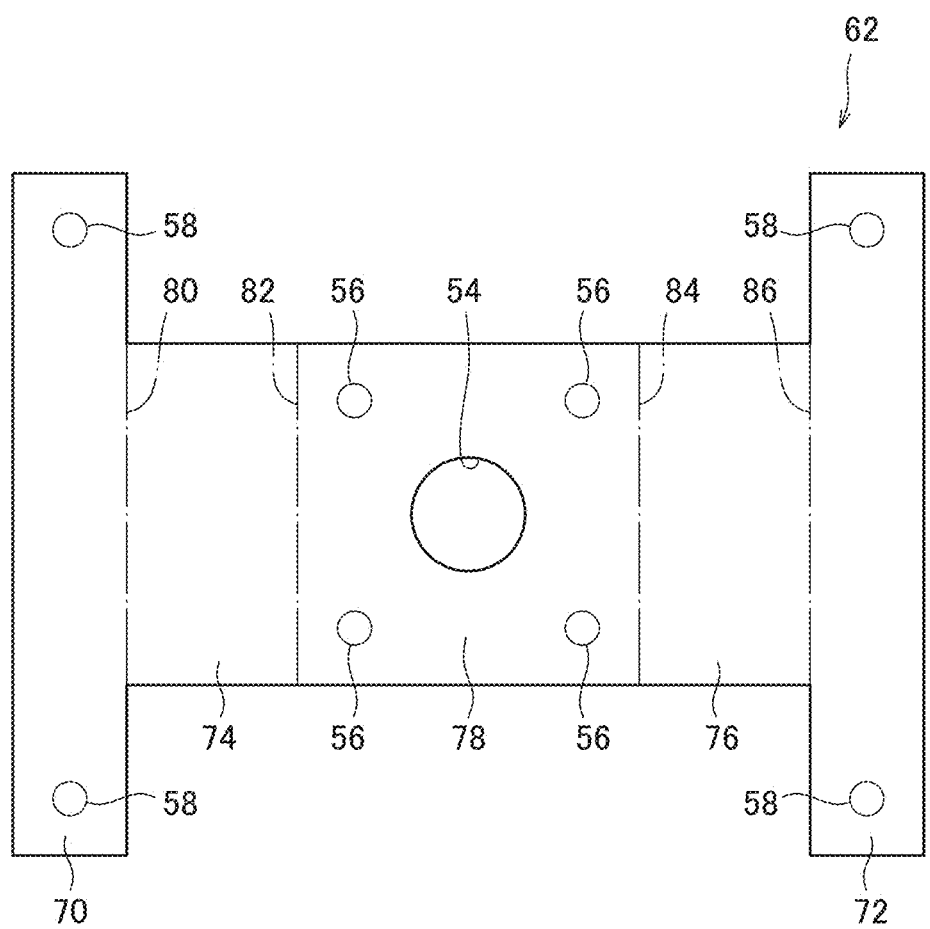
FIG. 5 is a plan view showing an intermediate product of the current collecting lead.

First, a metallic thin plate is processed to prepare an intermediate product 62 of the current collecting lead made of a thin plate in a substantially H-shape in plan view as shown in FIG. 5. The thin plate is sufficiently thicker than a conventional positive electrode ribbon. Elongated parts positioned on both sides in the intermediate product 62 are leg portion scheduled regions 70 and 72 that will be the leg portions 50 and 52. Regions continued to the inside of the leg portion scheduled regions 70 and 72 are side wall portion scheduled regions 74 and 76 that will be the side wall portions 42 and 44. A region between the side wall portion scheduled region 74 and the side wall portion scheduled region 76 is a top wall portion scheduled region 78 that will be the top wall portion 36.

In the intermediate product 62, the through hole 54 is further punched and drilled at the center of the top wall portion scheduled region 78.

The projection portions 56 and 58 are then pressed and provided at predetermined positions around the through hole 54 and at predetermined positions on both ends of the leg portion scheduled regions 70 and 72.

Subsequently, parts of virtual lines 80, 82, 84, and 86 are bent to form the current collecting lead 34 as shown in FIG. 3.

Next, a procedure of assembling the battery 1 will be described.

The electrode group 4 as described above is prepared. The negative electrode current collector is connected to the other end side of the electrode group 4, and then the electrode group 4 is housed in the outer can. The negative electrode current collector is welded to the bottom wall of the outer can through resistance spot welding.

Next, a predetermined amount of alkaline electrolyte is injected into the outer can 2. The alkaline electrolyte injected into the outer can 2 is held by the electrode group 4, and most of the alkaline electrolyte is held by the separator 10. The alkaline electrolyte progresses electrochemical reaction of charge and discharge (charge and discharge reaction) between the positive electrode 6 and the negative electrode 8. An alkaline electrolyte containing at least one of KOH, NaOH, and LiOH as a solute is preferably used as the alkaline electrolyte.

Next, the positive electrode current collector 28 is placed on one end side of the electrode group 4, and the current collecting lead 34 is further placed on the positive electrode current collector 28. In this state, the sealing body 14 is arranged on the upper end opening portion of the outer can 2 via the insulating gasket 18. In this case, the current collecting lead 34 and the sealing body 14 are in contact with each other.

Subsequently, a current is applied while applying pressure between the positive electrode terminal 22 and the negative electrode terminal of the battery 1, and resistance spot welding is performed. As a result, the positive electrode connection edge portion 32 of the positive electrode 6 and the positive electrode current collector 28 are welded. The positive electrode current collector 28 and the leg portions 50 and 52 of the current collecting lead 34 are welded, and the top wall portion 36 of the current collecting lead 34 and the cover plate 16 of the sealing body 14 are welded.

The opening edge 17 of the outer can 2 is then caulked to seal the opening 3 of the outer can 2.

Here, the projections (burrs) of the edge parts of the slits 30 are arranged to come into contact with the positive electrode connection edge portion 32 of the positive electrode 6 in the positive electrode current collector 28. When the resistance spot welding is performed, the welding current is concentrated on the parts of the projections (burrs). Part of the projections (burrs) melts to form welded portions, and the positive electrode current collector 28 and the positive electrode connection edge portion 32 of the positive electrode 6 are connected. In the leg portions 50 and 52 of the current collecting lead 34, the projection portions 58 are arranged to come into contact with the positive electrode current collector 28. When the resistance spot welding is performed, the welding current is concentrated on the parts of the projection portions 58. Part of the projection portions 58 melts, and the leg portions 50 and 52 of the current collecting lead 34 and the positive electrode current collector 28 are connected. In the top wall portion 36 of the current collecting lead 34, the projection portions 56 are arranged to come into contact with the cover plate 16 of the sealing body 14. When the resistance spot welding is performed, the welding current is concentrated on the parts of the projection portions 56. Part of the projection portions 56 melts, and the top wall portion 36 of the current collecting lead 34 and the cover plate 16 are connected.

In this way, the positive electrode 6 and the positive electrode terminal 22 are electrically connected through the positive electrode current collector 28, the current collecting lead 34, and the cover plate 16, and the battery 1 is formed.

Here, main energization paths (paths of current) between the current collecting lead 34 and the positive electrode current collector 28 and between the positive electrode current collector 28 and the positive electrode connection edge portion 32 of the electrode group 4 will be described.

First, the positive electrode current collector 28 is simplified, a model in a circular shape as a whole is used. The positive electrode connection edge portion 32 of the electrode group 4 is also simplified, and a concentric model is used.

Figure 7:
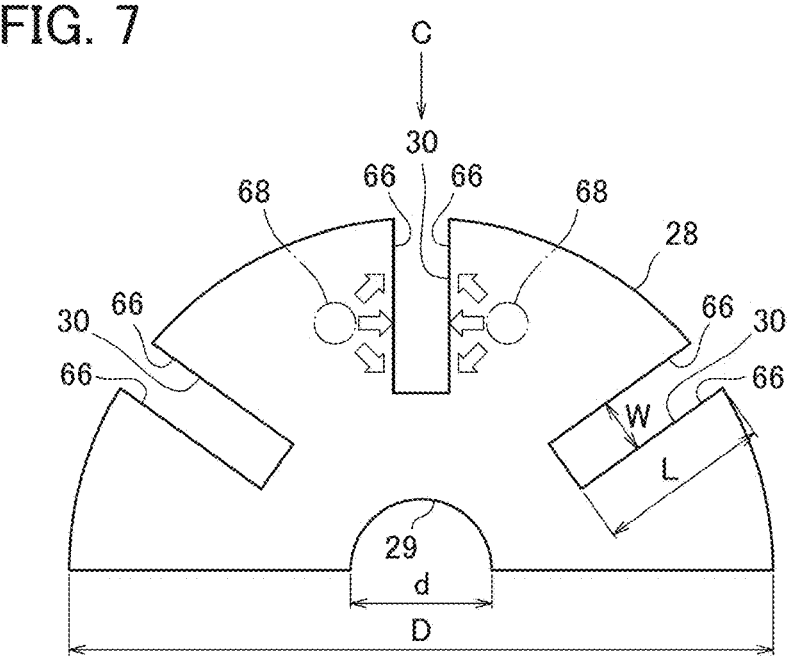
FIG. 7 is a plan view schematically showing a slit-type positive electrode current collector.
Figure 8:
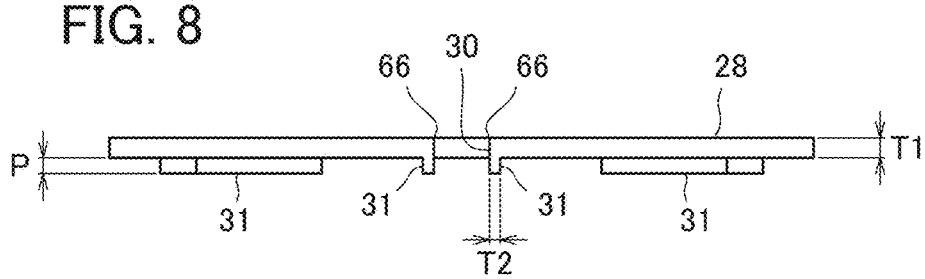
FIG. 8 is a side view of the slit-type positive electrode current collector as viewed in an arrow C direction in FIG. 7.

FIG. 7 shows the modeled positive electrode current collector 28. The shape of just a half of the positive electrode current collector 28 is schematically illustrated in FIG. 7. The overall shape of the positive electrode current collector 28 is circular. The center through hole 29 is provided at the center, and six slits 30 radially extending around the center through hole 29 are provided. The slits 30 extend to the outer peripheral edge of the positive electrode current collector 28. As shown in FIG. 8 that is a side view of the positive electrode current collector 28 as viewed in an arrow C direction of FIG. 7, projections (burrs) 31 protruding downward in FIG. 8 (direction toward the electrode group 4) are provided on edges 66 in the longitudinal direction of the slits 30. The positive electrode current collector 28 will be referred to as a slit type.

FIG. 7 schematically shows positions of places (hereinafter, lead welded portions 68) for welding the projection portions 58 of the current collecting lead 34 in the positive electrode current collector 28.

In FIG. 7, main energization paths are indicated by thick arrows. As shown in FIG. 7, the main energization paths are formed such that the current flows to the edges 66 of the slits 30 closest from the lead welded portions 68.

Figure 9:
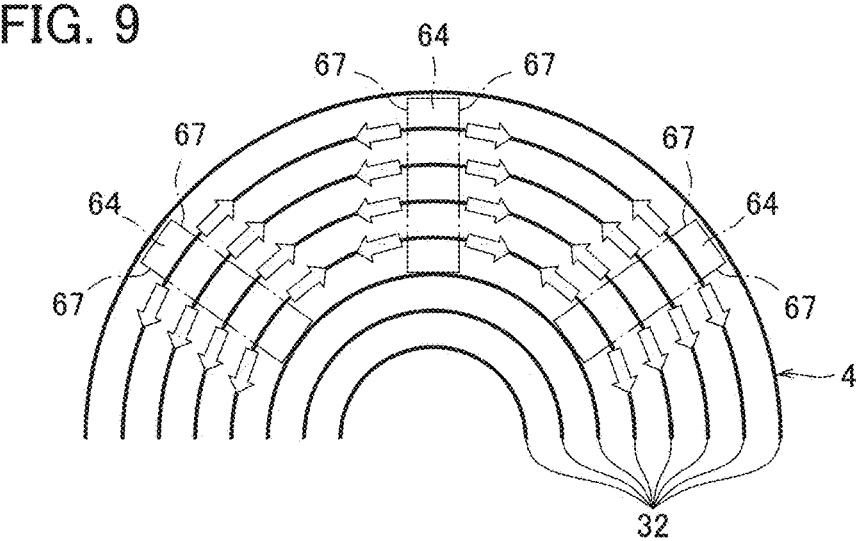
FIG. 9 is a plan view schematically showing a positive electrode connection edge portion combined with the slit-type positive electrode current collector.

Next, FIG. 9 shows the modeled positive electrode connection edge portion 32. The shape of just a half of the positive electrode connection edge portion 32 is schematically illustrated in FIG. 9. As is clear from FIG. 9, the positive electrode connection edge portion 32 is concentrically disposed.

FIG. 9 schematically shows a positional relationship between the slits 30 of the positive electrode current collector 28 and the positive electrode connection edge portion 32 of the electrode group 4. In FIG. 9, regions indicated by reference sign 64 are slit regions where the slits 30 of the positive electrode current collector 28 are positioned. As shown in FIG. 9, parts 67 corresponding to the edges 66 in the slit regions 64 and the positive electrode connection edge portion 32 cross at a relatively large number of places from the inside to the outside in the radial direction of the electrode group 4. The projections (burrs) 31 are formed on the edges 66 of the slits 30, and the contact parts of the projections (burrs) 31 and the positive electrode connection edge portion 32 serve as welded portions. Therefore, the positive electrode current collector 28 including the slits 30 with the projections (burrs) 31, that is, the slit-type positive electrode current collector 28, forms welded portions at a large number of places of the positive electrode connection edge portion 32. In FIG. 9, the main energization paths are indicated by thick arrows. As shown in FIG. 9, the energization paths from the positive electrode current collector 28 to the positive electrode connection edge portion 32 extend from a large number of crossing parts in the slits 30 and the positive electrode connection edge portion 32. Since the positive electrode current collector 28 and the positive electrode connection edge portion 32 contact at a relatively large number of places, the current input to and output from the positive electrode 6 flows across a relatively wide range, and the flow is relatively even.

In this way, the electrical resistance value becomes low when the current flows relatively evenly across a relatively wide range. As a result, the internal resistance value can be reduced in the battery, and this exhibits excellent high-rate charge and discharge characteristics.

Figure 10:
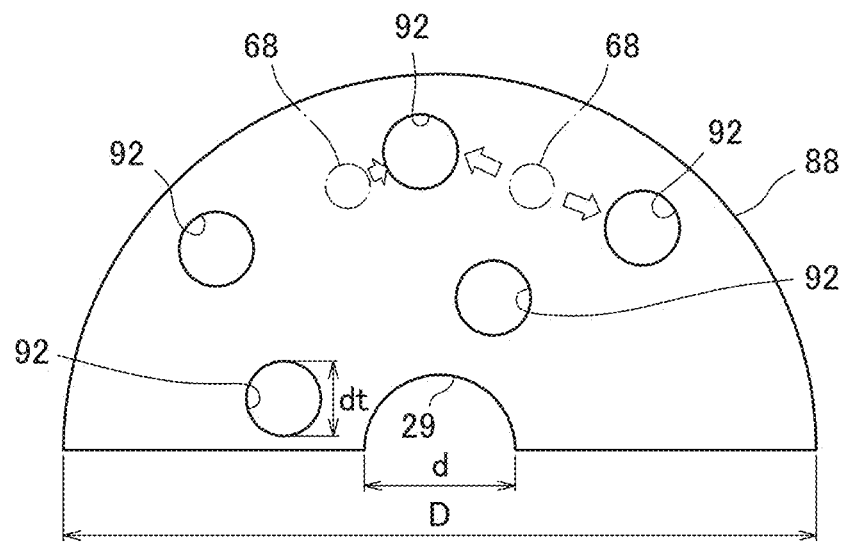
FIG. 10 is a plan view schematically showing a porous positive electrode current collector.

For comparison, main energization paths when a porous positive electrode current collector 88 as shown for example in FIG. 10 is used will also be described. The porous positive electrode current collector 88 includes a large number of dispersed circular through holes 92 in place of the slits 30, and a projection (burr) is formed on each through hole 92 along the periphery of the through hole 92.

FIG. 10 is a plan view corresponding to FIG. 7 and is a plan view schematically showing positions of the lead welded portions 68 in the porous positive electrode current collector 88. In FIG. 10, main energization paths are indicated by thick arrows. As shown in FIG. 10, the main energization paths are formed such that the current flows to the parts of the through holes 92 closest from the lead welded portions 68.

Figure 11:
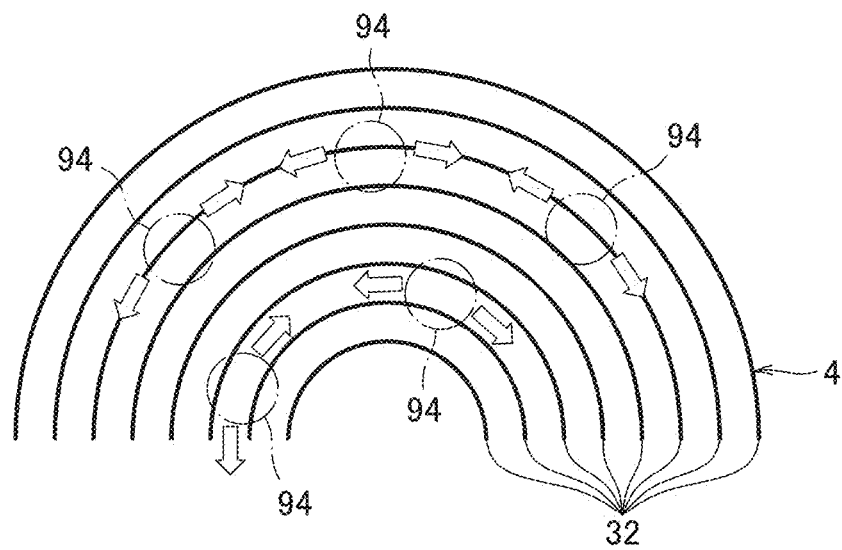
FIG. 11 is a plan view schematically showing a positive electrode connection edge portion combined with the porous positive electrode current collector.

Next, FIG. 11 is a plan view corresponding to FIG. 9 and is a plan view schematically showing a positional relationship between the through holes 92 of the porous positive electrode current collector 88 and the positive electrode connection edge portion 32 of the electrode group 4. In FIG. 11, regions indicated by reference sign 94 are through hole regions where the through holes 92 are positioned. Here, the contact parts of the projections (burrs) formed on the peripheries of the through holes 92 and the positive electrode connection edge portion 32 serve as welded portions. As shown in FIG. 11, some of the through hole regions 94 are positioned on the positive electrode connection edge portion 32 located on the outer peripheral side of the electrode group 4, and some other through hole regions 94 are positioned on the positive electrode connection edge portion 32 located on the inner peripheral side of the electrode group 4. In FIG. 11, the main energization paths are indicated by thick arrows. As shown in FIG. 11, the energization paths from the positive electrode current collector 88 to the positive electrode connection edge portion 32 extend from the parts where the peripheries of the through holes 92 and the positive electrode connection edge portion 32 cross. In the porous positive electrode current collector 88, the number of places where one through hole region 94 crosses the positive electrode connection edge portion 32 is smaller than the number of places where one slit region 64 crosses the positive electrode connection edge portion 32 in the slit-type positive electrode current collector 28. In other words, the positive electrode current collector 88 and the positive electrode connection edge portion 32 contact at relatively few places. Therefore, the current input to and output from the positive electrode 6 flows in a relatively narrow range, and the flow is relatively biased.

In this way, the electrical resistance value becomes high when the current flows in a relatively narrow ranged and is biased. As a result, the internal resistance value cannot be reduced in the battery adopting the porous positive electrode current collector 88, compared to when the slit-type positive electrode current collector 28 is adopted.

As described, when the slit-type positive electrode current collector 28 is used, the internal resistance value of the battery can be reduced compared to the porous positive electrode current collector 88, and the high-rate charge and discharge characteristics of the battery can be improved. This is preferable.

In the resistance spot welding and the caulking, compressive stress is applied to the battery 1 in a direction along the axis of the battery 1. Accordingly, compressive stress is also applied to components of the battery 1, such as the electrode group 4, the positive electrode current collector 28, and the current collecting lead 34. When the current collecting lead 34 is subjected to the compressive stress in directions in which the top wall portion 36 and the leg portions 50 and 52 approach with each other (arrow A direction and arrow B direction in FIG. 4), the side wall portions 42 and 44 are laterally curved and deformed in the directions in which the top wall portion 36 and the leg portions 50 and 52 approach with each other as shown in FIG. 1. In this way, when the current collecting lead 34 can be easily deformed, deformation of the positive electrode current collector 28 can be reduced, and compression of the electrode group 4 can be reduced. As a result, occurrence of an internal short circuit can be prevented.

In embodiments of the present invention, a deformation resistance A of the current collecting lead 34 is set smaller than a deformation resistance B of the positive electrode current collector 28 to more easily deform the current collecting lead 34 than the positive electrode current collector 28. In other words, a relationship of A<B is satisfied. In this way, the deformation resistance is balanced in the current collecting lead 34 and the positive electrode current collector 28, and the current collecting lead 34 is preferentially deformed when the compressive stress is applied to the current collecting lead 34 and the positive electrode current collector 28 in the process of the caulking and the resistance spot welding. This prevents the positive electrode current collector 28 from compressing the electrode group 4 more than necessary. As a result, occurrence of a short circuit can be prevented.

The deformation resistance here denotes a resistance in the deformation, that is, a degree of power necessary for the deformation. The deformation resistance depends on, for example, the thickness of the material when the same material is used, and the deformation resistance increases with an increase in the thickness. The deformation resistance depends on the characteristics of the materials, such as the hardness of the materials, when different materials are used. The higher the hardness of the material, the higher the deformation resistance.

In an embodiment, the thickness of the material of the positive electrode current collector 28 is thicker than the thickness of the material of the current collecting lead 34.

In an embodiment, the hardness of the material of the positive electrode current collector 28 is greater than the hardness of the material of the current collecting lead 34.

In an embodiment, the material of the current collecting lead 34 is pure Ni, and the material of the positive electrode current collector 28 is Ni-plated steel obtained by applying Ni-plating to a steel plate containing 0.01% or more by mass and 0.1% or less by mass of carbon. The pure Ni denotes high purity nickel with a purity of 99.5% or more.

In an embodiment, the material of the current collecting lead 34 is ultra-low carbon steel containing 0.001% or more by mass and 0.005% or less by mass of carbon, and the material of the positive electrode current collector 28 is Ni-plated steel obtained by applying Ni-plating to a steel plate containing 0.01% or more by mass and 0.1% or less by mass of carbon.

Various devices are becoming smaller in recent years, and high-rate discharge of electricity is also required in small devices. Under the circumstances, discharge of electricity at a higher rate is also required for small batteries, such as an AA battery (equivalent to R6 battery) and an AAA battery (equivalent to R03 battery), used in small devices.

However, in the small batteries, the current collecting lead needs to be smaller than in large batteries, such as a D battery (equivalent to R20 battery) and a C battery (equivalent to R14 battery). The flexibility of the current collecting lead decreases with a decrease in the size of the current collecting lead. Therefore, when the compressive stress is applied in the axial direction of the battery, the current collecting lead is not sufficiently deformed, and the force is directly transmitted to the current collector. Consequently, the positive electrode current collector is deformed, and the electrode group is compressed. A short circuit more easily occurs. The number of turns of the electrode group is small in a small battery, and the strength in the axial direction of the electrode group is also low. Therefore, a short circuit associated with the deformation of the positive electrode current collector more easily occurs in a small battery using the current collecting lead simply downsized to obtain excellent high-rate discharge characteristics, as compared to a large battery.

Under the circumstances, the deformation resistance between the positive electrode current collector and the current collecting lead is balanced to preferentially deform the current collecting lead, and the deformation of the positive electrode current collector is prevented in embodiments of the present invention. This can avoid compression of the electrode group, and embodiments of the present invention are effective in reducing the occurrence of short circuits in a small battery with excellent high-rate discharge characteristics, such as a battery with a diameter of 19 mm or less, more preferably, a battery with a diameter of 18 mm or less.

Here, it is preferable that the side wall portions 42 and 44 include deformation promoting portions that promote deformation to further facilitate the deformation when the current collecting lead 34 is subjected to the compressive stress. To provide the deformation promoting portions to the side wall portions 42 and 44, curved portions can be provided to the side wall portions 42 and 44, or the side wall portions 42 and 44 can be processed into a curved shape, for example. If the side wall portions 42 and 44 are curved in advance, the side wall portions 42 and 44 laterally expand when the compressive stress is applied, and the current collecting lead 34 can be easily squeezed in the compression direction. To attain such a mode, it is preferable to execute a curving process of curving the side wall portion scheduled regions 74 and 76 in the bending step of the intermediate product 62 of the current collecting lead 34.

The shape of the deformation promoting portion is not limited to the curved shape, and other shapes, such as a bent shape, that can promote the deformation may be adopted.

Although the positive electrode current collector 28 is welded after the electrode group 4 is housed in the outer can 2 in the procedure of assembling the battery 1, the mode is not limited to this, and the positive electrode current collector 28 may be welded to the electrode group 4 in advance.

EXAMPLES

Example 1

The positive electrode 6, the negative electrode 8, and the separator 10 used in a general nickel-hydrogen secondary battery are prepared. The positive electrode 6, the negative electrode 8, and the separator 10 are strip-shaped. The separator 10 is interposed between the prepared a positive electrode 6 and a negative electrode 8, and the positive electrode 6 and the negative electrode 8 are spirally wound to form the electrode group 4 for AA size. In the winding, the positive electrode 6 and the negative electrode 8 are slightly shifted from each other in the direction along the axial direction of the electrode group 4, and the separator 10 is arranged at predetermined positions between the positive electrode 6 and the negative electrode 8. The winding operation is performed in this state, and the columnar electrode group 4 is obtained. In the obtained electrode group 4, the positive electrode connection edge portion 32 of the positive electrode 6 protrude more than the negative electrode 8 adjacent to the positive electrode 6 across the separator 10 on one end side of the electrode group 4, and the negative electrode connection edge portion of the negative electrode 8 protrude more than the positive electrode 6 adjacent to the negative electrode 8 across the separator 10 on the other end side of the electrode group 4.

Next, the disc-shaped negative electrode current collector for AA size made of a Ni-plated steel thin plate is prepared. The negative electrode current collector is welded to the negative electrode connection edge portion of the electrode group 4.

Next, the positive electrode current collector 28 for AA size that is decagonal as a whole as shown in FIG. 2 is prepared, the positive electrode current collector 28 including: the circular center through hole 29 at the center; and the six slits 30 radially extending around the center through hole 29. The positive electrode current collector 28 is made of a Ni-plated steel plate obtained by applying Ni-plating to a steel thin plate containing 0.04% by mass of carbon. The thickness of the positive electrode current collector 28 is 0.30 mm. The value of the thickness is indicated as the thickness of the current collector in Table 1.

Next, a Ni-plated steel plate obtained by applying Ni-plating to a steel thin plate containing 0.04% by mass of carbon is prepared. The thickness of the Ni-plated steel plate is 0.25 mm. The Ni-plated steel plate is punched to manufacture the substantially H-shaped intermediate product 62 of the current collecting lead as shown in FIG. 5. The through hole 54 is drilled at the center of the intermediate product 62, and the projection portions 56 and 58 are formed by pressing at predetermined positions. The parts of the virtual lines 80, 82, 84, and 86 are then bent to form the current collecting lead 34 as shown in FIG. 3. The value of the thickness of the Ni-plated steel plate used to manufacture the current collecting lead 34 is indicated as the thickness of the current collecting lead in Table 1.

Next, the electrode group 4 including the welded negative electrode current collector is housed in the bottomed cylindrical outer can 2. The inner surface of the bottom wall of the outer can 2 and the negative electrode current collector are then welded.

Next, a pressure sensor is disposed on the upper end of the electrode group 4 to allow measuring the compressive stress applied to the electrode group 4. The signal line of the pressure sensor is derived to the outside through a hole opened at a predetermined position of the outer can 2 and is connected to a measurement device of the compressive stress. The positive electrode current collector 28 is then placed on the pressure sensor, and the current collecting lead 34 is further placed on the positive electrode current collector 28. In this state, the sealing body 14 is arranged on the upper end opening portion of the outer can 2 via the insulating gasket 18, and the intermediate product of the battery for stress measurement for measuring the compressive stress applied to the electrode group 4 is manufactured. The intermediate product of the battery for stress measurement is set on a resistance spot welding machine, and the same pressure as in the welding is applied in the axial direction of the stress measurement battery without applying the welding current. Subsequently, the opening edge 17 of the outer can 2 is caulked to seal the opening 3 of the outer can 2 to manufacture the battery 1.

The compressive stress applied to the electrode group 4 through the pressurization and the caulking by the resistance spot welding machine is measured. The maximum value of the measurement values is indicated as a maximum stress applied to the electrode group in Table 1.

Figure 6:
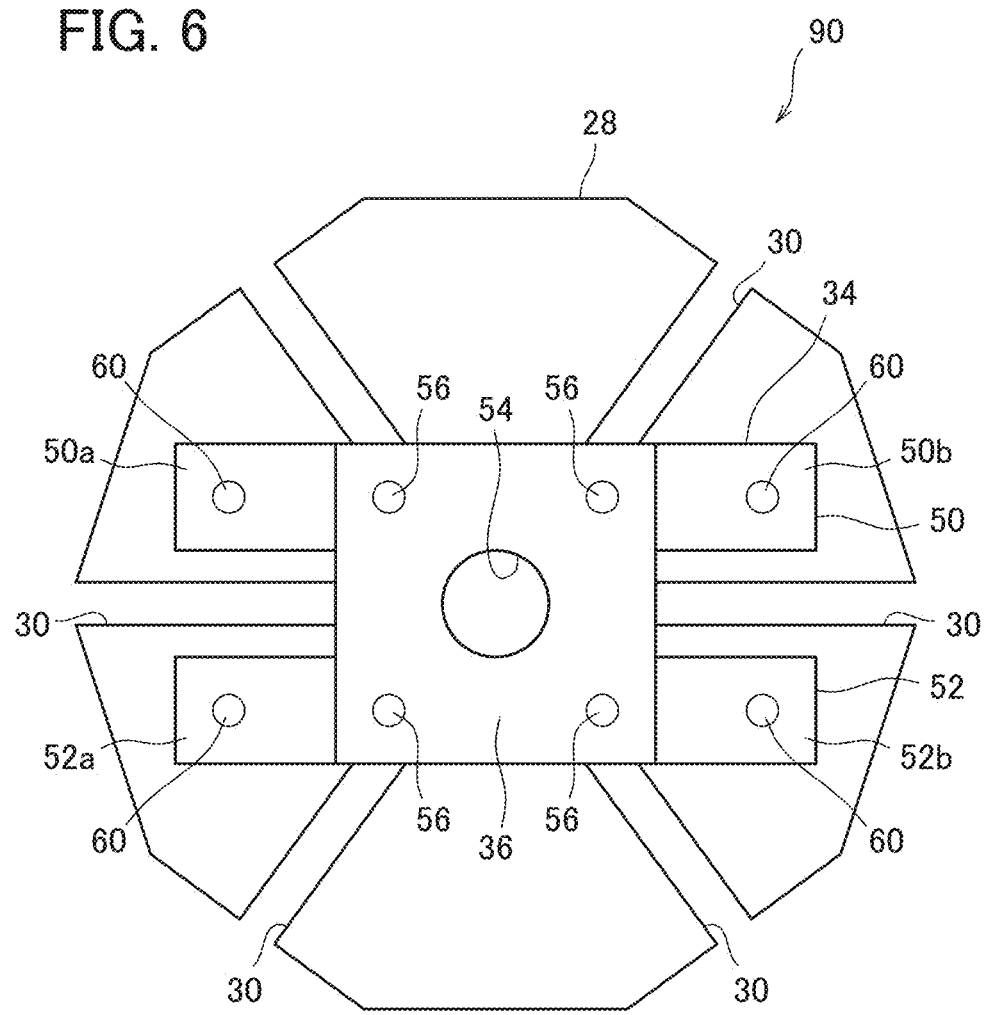
FIG. 6 is a plan view showing a current collecting component in which the positive electrode current collector and the current collecting lead are integrated.

A sample for resistance measurement is separately manufactured for the positive electrode current collector 28 and the current collecting lead 34. More specifically, as shown in FIG. 6, the current collecting lead 34 is placed on the positive electrode current collector 28, and resistance spot welding is applied to integrate the positive electrode current collector 28 and the current collecting lead 34 to manufacture a current collecting component 90. For the current collecting component 90, a resistance value between the positive electrode current collector 28 and the current collecting lead 34 is measured. The resistance value is indicated as a resistance value of the current collecting component in Table 1.

Comparative Example 1

A conventional positive electrode ribbon made of Ni foil with a thickness of 0.01 mm is prepared in place of the current collecting lead. The positive electrode ribbon is welded to the positive electrode current collector to form a current collecting component, and the thickness of the positive electrode current collector is 0.25 mm. Other than that, the intermediate product of the battery for stress measurement is manufactured in the same way as in Example 1. As in Example 1, the resistance value of the current collecting component and the maximum stress applied to the electrode group are measured.

Comparative Example 2

The thickness of the positive electrode current collector is 0.25 mm, and the thickness of the current collecting lead is 0.30 mm. Other than that, the intermediate product of the battery for stress measurement and the current collecting component are manufactured in the same way as in Example 1. As in Example 1, the resistance value of the current collecting component and the maximum stress applied to the electrode group are measured.

Comparative Example 3

The thickness of the current collecting lead is 0.30 mm. Other than that, the intermediate product of the battery for stress measurement and the current collecting component are manufactured in the same way as in Example 1. As in Example 1, the resistance value of the current collecting component and the maximum stress applied to the electrode group are measured.

Example 2

The thickness of the Ni-plated steel plate of the positive electrode current collector is 0.40 mm, and the thickness of the Ni-plated steel plate of the current collecting lead is 0.30 mm. Other than that, the intermediate product of the battery for stress measurement and the current collecting component are manufactured in the same way as in Example 1. As in Example 1, the resistance value of the current collecting component and the maximum stress applied to the electrode group are measured. The thickness of the current collector, the thickness of the current collecting lead, the material of the current collector, the material of the current collecting lead, the resistance value of the current collecting component, and the maximum stress applied to the electrode group are indicated in Table 2.

Example 3

The thickness of the positive electrode current collector is 0.40 mm, a Ni-plated ultra-low carbon steel plate obtained by applying Ni-plating to an ultra-low carbon steel thin plate containing 0.001% by mass of carbon is prepared as a material of the current collecting lead in place of the Ni-plated steel plate obtained by applying Ni-plating to the steel thin plate containing 0.04% by mass of carbon, and the thickness of the Ni-plated ultra-low carbon steel plate is 0.30 mm. Other than that, the intermediate product of the battery for stress measurement and the current collecting component are manufactured in the same way as in Example 1. As in Example 1, the resistance value of the current collecting component and the maximum stress applied to the electrode group are measured. The thickness of the current collector, the thickness of the current collecting lead, the material of the current collector, the material of the current collecting lead, the resistance value of the current collecting component, and the maximum stress applied to the electrode group are indicated in Table 2.

Example 4

The thickness of the positive electrode current collector is 0.40 mm, a pure Ni thin plate is prepared as a material of the current collecting lead in place of the Ni-plated steel plate, and the thickness of the pure Ni thin plate is 0.30 mm. Other than that, the intermediate product of the battery for stress measurement and the current collecting component are manufactured in the same way as in Example 1. As in Example 1, the current value of the current collecting component and the maximum stress applied to the electrode group are measured. The thickness of the current collector, the thickness of the current collecting lead, the material of the current collector, the material of the current collecting lead, the resistance value of the current collecting component, and the maximum stress applied to the electrode group are indicated in Table 2.

When the resistance value of the current collecting component exceeds 0.5 mΩ, the internal resistance of the entire battery increases, and the obtained high-rate discharge characteristics of the battery can be equivalent to those of the conventional battery. Such a battery is determined to be a conventional product, and a mark "-" is put in the field of the determination in Table 1.

When the resistance value of the current collecting component is 0.5 mΩ or less, the internal resistance of the entire battery is also reduced, and the obtained high-rate discharge characteristics of the battery are excellent. When the resistance value of the current collecting component is 0.25 mΩ or less, the obtained high-rate discharge characteristics of the battery are more excellent.

On the other hand, when the maximum stress applied to the electrode group exceeds 30.0 kgf/mm$^2$, the deformation of the positive electrode current collector becomes large, and the degree of compression of the electrode group increases. As a result, a large number of internal short circuits can occur due to the bend of the positive electrode and the negative electrode. When the maximum stress applied to the electrode group is 30.0 kgf/mm$^2$ or less, the degree of compression of the electrode group caused by the deformation of the positive electrode current collector can be within a permissible range, and the occurrence of internal short circuit due to the bend of the positive electrode and the negative electrode can be reduced. When the maximum stress applied to the electrode group is 20.0 kgf/mm² or less, the deformation of the positive electrode current collector can be reduced, and this is preferable. When the maximum stress applied to the electrode group is 15.0 kgf/mm² or less, the deformation of the positive electrode current collector can be further reduced, and this is more preferable.

Therefore, a battery in which the resistance value of the current collecting component is 0.5 mΩ or less, but the maximum stress applied to the electrode group exceeds 30.0 kgf/mm², has excellent high-rate discharge characteristics. However, the positive electrode current collector can be easily deformed, and the battery is determined to have a poor quality. A mark "x" is put for the battery determined to have a poor quality in the field of the determination in Table 1.

For a battery in which the resistance value of the current collecting component is 0.5 mΩ or less, and the maximum stress applied to the electrode group is 30.0 kgf/mm² or less, excellent high-rate discharge characteristic can be obtained, and the deformation of the positive electrode current collector can be reduced to some extent. Therefore, the battery is determined to be good. A mark "Δ" is put for the battery determined to be good in the field of the determination in Table 1.

A battery, in which the resistance value of the current collecting component is 0.5 mΩ or less, and the maximum stress applied to the electrode group is 20.0 kgf/mm² or less, has excellent high-rate discharge characteristics, and the deformation of the positive electrode current collector can be reduced. Therefore, the battery is determined to be excellent. A mark "O" is put for the battery determined to be excellent in the field of the determination in Table 1.

A battery, in which the resistance value of the current collecting component is 0.25 mΩ or less, and the maximum stress applied to the electrode group is 15.0 kgf/mm² or less, can have excellent high-rate discharge characteristics. The deformation of the positive electrode current collector can be further reduced, and the occurrence of internal short circuit of the battery can be further reduced. Therefore, the battery is determined to have the best quality. A mark "◎" is put for the battery determined to have the best quality in the field of the determination in Table 1.

TABLE 1

| | Thickness of Current Collector [mm] | Thickness of Current Collecting Lead [mm] | Material of Current Collector | Material of Current Collecting Lead | Resistance Value of Current Collecting Component [mΩ] | Maximum Stress Applied to Electrode Group [kgf/mm²] | Determination |
|---|---|---|---|---|---|---|---|
| Example 1 | 0.30 | 0.25 | Ni-Plated Steel | Ni-Plated Steel | 0.39 | 16.5 | O |
| Comparative Example 1 | 0.25 | — | Ni-Plated Steel | — | 0.95 | 13.6 | — |
| Comparative Example 2 | 0.25 | 0.30 | Ni-Plated Steel | Ni-Plated Steel | 0.34 | 31.8 | X |
| Comparative Example 3 | 0.30 | 0.30 | Ni-Plated Steel | Ni-Plated Steel | 0.34 | 30.6 | X |

TABLE 2

| | Thickness of Current Collector [mm] | Thickness of Current Collecting Lead [mm] | Material of Current Collector | Material of Current Collecting Lead | Resistance Value of Current Collecting Component [mΩ] | Maximum Stress Applied to Electrode Group [kgf/mm²] | Determination |
|---|---|---|---|---|---|---|---|
| Example 2 | 0.40 | 0.30 | Ni-Plated Steel | Ni-Plated Steel | 0.34 | 20.4 | Δ |
| Example 3 | 0.40 | 0.30 | Ni-Plated Steel | Ni-Plated Ultra-Low Carbon Steel | 0.34 | 17.2 | O |
| Example 4 | 0.40 | 0.30 | Ni-Plated Steel | Pure Ni | 0.21 | 12.1 | ◎ |

[Analysis]

The positive electrode current collector included in the battery with the same configuration as the battery of Example 3 is modeled into the slit-type positive electrode current collector as shown in FIG. 7, and the positive electrode connection edge portion of the electrode group included in the battery is modeled into the concentric shape as shown in FIG. 9. A constant voltage is applied to the positive electrode terminal of the battery, and the potential distribution and the electrical resistance value are analyzed.

In the analysis, the dimensions of the components of the slit-type positive electrode collector are set as follows.

A diameter D of the positive electrode current collector 28 is 15.00 mm, a diameter d of the center through hole 29 is 3.00 mm, a length L of the slits 30 is 3.75 mm, and a width W of the slits 30 is 1.20 mm (see FIG. 7). A thickness T1 of the positive electrode current collector 28 is 0.40 mm, a length (length of protrusions from the lower surface of the positive electrode current collector) P of the projections (burrs) is 0.35 mm, and a thickness T2 of the projections (burrs) is 0.20 mm (see FIG. 8).

Figure 12:
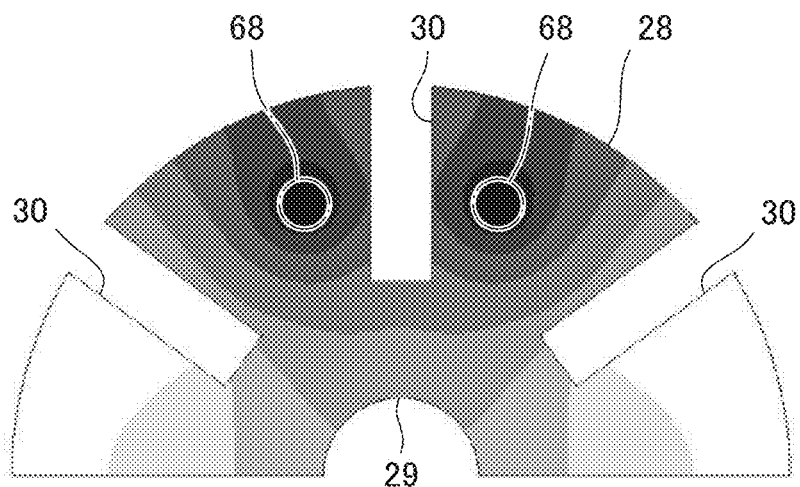
FIG. 12 is a plan view showing analysis results of a potential distribution obtained for the slit-type positive electrode current collector.
Figure 13:
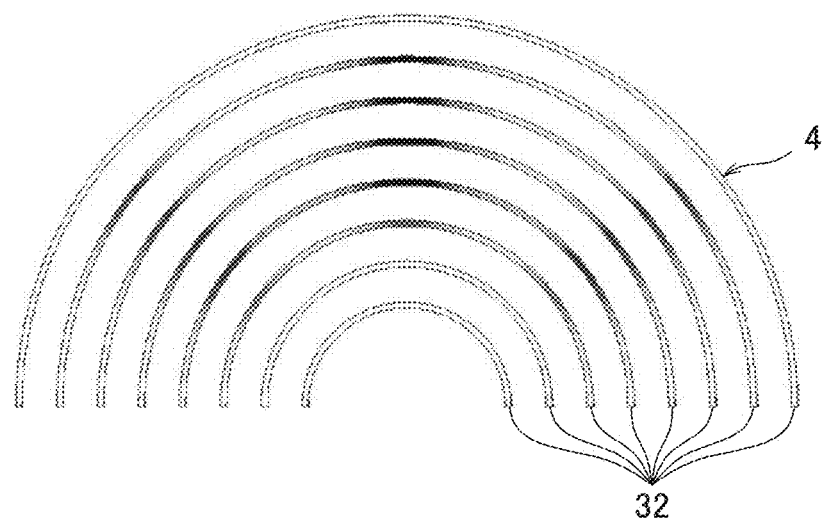
FIG. 13 is a plan view showing analysis results of the potential distribution obtained for the positive electrode connection edge portion combined with the slit-type positive electrode current collector.

The degree of drop in potential is visualized in the analysis of the potential distribution. FIG. 12 shows analysis results of the potential distribution obtained for the slit-type positive electrode current collector 28. FIG. 13 shows analysis results of the potential distribution obtained for the positive electrode connection edge portion 32 combined with the slit-type positive electrode current collector 28. In FIGS. 12 and 13, the tone of gray indicates the degree of drop in potential. The darker the gray, the larger the degree of drop in potential. The lighter the gray, the smaller the degree of drop in potential. Therefore, the darker the gray and the larger the drop in potential, the larger the resistance value. Note that the same method of expressing the degree of drop in potential is applied to the results of FIGS. 14 and 15 described later.

The electrical resistance value of the part of the positive electrode current collector 28 is obtained in the analysis of the electrical resistance value. As a result, the electrical resistance value of the slit-type positive electrode current collector 28 is 0.0313 mΩ. The electrical resistance value of the combined part of the slit-type positive electrode current collector 28 and the positive electrode connection edge portion 32 is 0.0884 mΩ.

Figure 14:
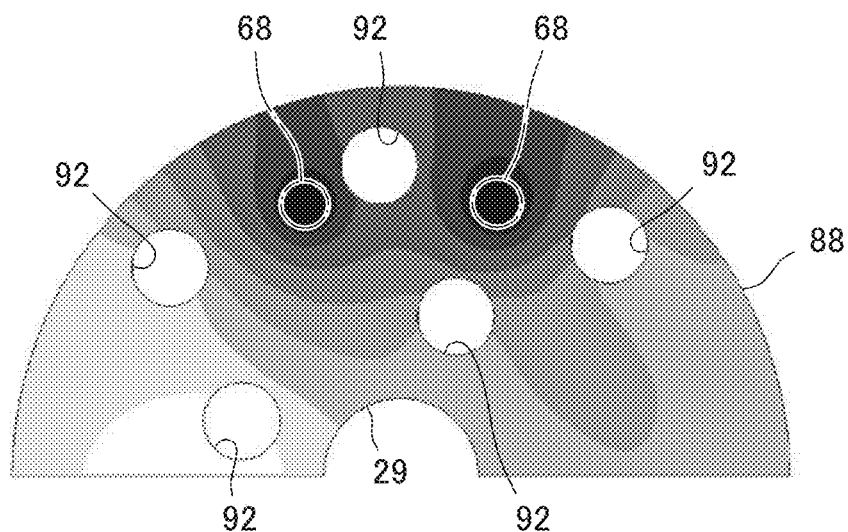
FIG. 14 is a plan view showing analysis results of the potential distribution obtained for the porous positive electrode current collector.
Figure 15:
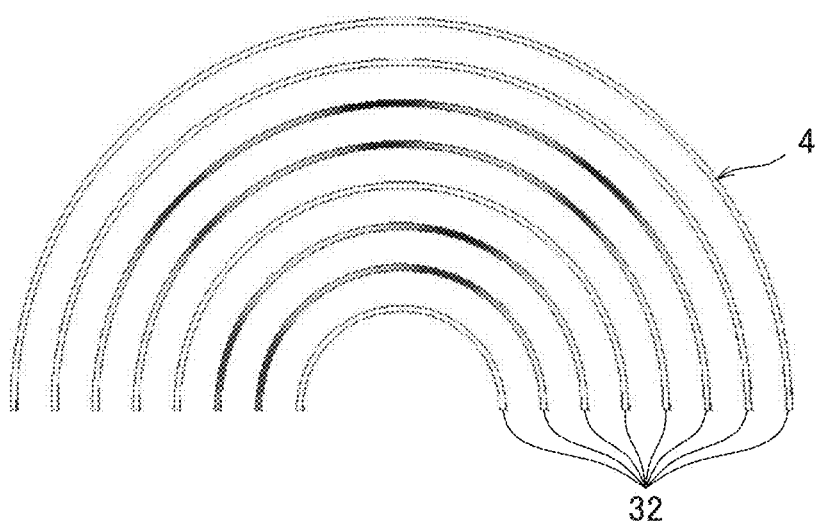
FIG. 15 is a plan view showing analysis results of the potential distribution obtained for the positive electrode connection edge portion combined with the porous positive electrode current collector.

The potential distribution and the electrical resistance value are similarly analyzed for the mode in which the positive electrode current collector is changed from the slit-type positive electrode current collector 28 to the porous positive electrode current collector 88 shown in FIG. 10. FIG. 14 shows analysis results of the potential distribution obtained for the porous positive electrode current collector 88. FIG. 15 shows analysis results of the potential distribution obtained for the positive electrode connection edge portion 32 combined with the porous positive electrode current collector 88.

As for the dimensions of the components of the porous positive electrode current collector 88, the diameter D of the positive electrode current collector 88 is 15.00 mm, the diameter d of the center through hole 29 is 3.00 mm, and a diameter dt of the through holes 92 is 1.50 mm (see FIG. 10). The thickness T1 of the positive electrode current collector 88 is 0.40 mm, the length (length of protrusions from the lower surface of the positive electrode current collector) P of the projections (burrs) is 0.35 mm, and the thickness T2 of the projections (burrs) is 0.20 mm.

As a result, the electrical resistance value of the porous positive electrode current collector 88 is 0.0293 mΩ. The electrical resistance value of the combined part of the porous positive electrode current collector 88 and the positive electrode connection edge portion 32 is 0.1164 mΩ.

[Consideration]

The resistance value of the current collecting component is 0.95 mΩ in Comparative Example 1 using the conventional positive electrode ribbon, and the value is higher than in Examples 1, 2, 3, and 4 and Comparative Examples 2 and 3 using the current collecting lead. Therefore, it can be understood that the high-rate discharge characteristics are more excellent when the current collecting lead is used, as compared to the conventional positive electrode ribbon. This can be because the resistivity of the thin and elongated positive electrode ribbon is high, and the resistivity of the current collecting lead with shortened energization paths is low.

As in Comparative Examples 2 and 3, the maximum stress applied to the electrode group is a high value exceeding 30.0 $kgf/mm^2$ when the thickness of the current collector is thinner than the thickness of the current collecting lead or when the thickness of the current collector and the thickness of the current collecting lead are the same. In this way, if the thickness of the current collector is equal to or smaller than the thickness of the current collecting lead, the deformation resistance of the current collector is smaller than the deformation resistance of the current collecting lead, and the current collector is more easily deformed than the current collecting lead when the compressive stress is applied. Therefore, the current collector is deformed, and the electrode group is subjected to a relatively large stress. As a result, an internal short circuit can easily occur.

On the other hand, in Examples 1, 2, 3, and 4 in which the thickness of the current collector is thicker than the thickness of the current collecting lead, the maximum stress applied to the electrode group is a value lower than in Comparative Examples 2 and 3. In this way, if the thickness of the current collector is thicker than the thickness of the current collecting lead, the deformation resistance of the current collecting lead is smaller than the deformation resistance of the current collector, and the current collecting lead is more easily deformed than the current collector when the compressive stress is applied. Therefore, the current collecting lead is preferentially deformed, and the deformation of the current collector is reduced. The stress applied to the electrode group is relatively small. As a result, the internal short circuit is unlikely to occur.

In Example 2, the material of the current collector is a thin plate made of Ni-plated steel, and the material of the current collecting lead is also a thin plate made of the same Ni-plated steel. Therefore, the deformation resistance regarding the material is the same in the current collecting lead and the current collector.

In Example 3, the material of the current collector is a thin plate made of Ni-plated steel, and the material of the current collecting lead is Ni-plated ultra-low carbon steel obtained by applying Ni-plating to a thin plate of ultra-low carbon steel. The hardness of the Ni-plated ultra-low carbon steel is lower than the hardness of the Ni-plated steel. Therefore, the deformation resistance regarding the material of the current collecting lead is smaller than the deformation resistance regarding the material of the current collector, and the current collecting lead is more easily deformed than the current collector when the compressive stress is applied. As a result, the current collecting lead is preferentially deformed, and the deformation of the current collector is reduced. The stress applied to the electrode group is relatively small. This is also evident from the fact that the value of the maximum stress applied to the electrode group in Example 3 is smaller than the value of the maximum stress applied to the electrode group in Example 2 in which the material of the current collecting lead and the material of the current collector are the same. Therefore, as compared to Example 2, the internal short circuit is less likely to occur in Example 3.

In Example 4, the material of the current collector is a thin plate made of Ni-plated steel, and the material of the current collecting lead is a thin plate made of pure Ni. The hardness of the pure Ni is lower than the hardness of the Ni-plated steel. Therefore, the deformation resistance regarding the material of the current collecting lead is smaller than the deformation resistance regarding the material of the current collector, and the current collecting lead is more easily deformed than the current collector when the compressive stress is applied. As a result, the current collecting lead is preferentially deformed, and the deformation of the current collector is reduced. The stress applied to the electrode group is relatively small. This is also evident from the fact that the value of the maximum stress applied to the electrode group in Example 4 is smaller than the value of the maximum stress applied to the electrode group in Example 2 in which the material of the current collecting lead and the material of the current collector are the same. Therefore, compared to Example 2, the internal short circuit is further less likely to occur in Example 4.

As described, the thickness of the current collecting lead can be thinner than the thickness of the current collector, or the hardness of the material of the current collecting lead can be lower than the hardness of the material of the current collector. In this way, the deformation resistance of the current collecting lead can be smaller than the deformation resistance of the current collector, and the deformation resistance of the current collecting lead and the deformation resistance of the current collector can be balanced. This can reduce the occurrence of internal short circuit while maintaining excellent high-rate discharge characteristics.

It can be understood from FIG. 12 showing the analysis results of the potential distribution of the slit-type positive electrode current collector 28 that the degree of change in gray between the lead welded portion 68 and the slits 30 is substantially even among the slits. Therefore, it can be stated that the drop in potential is substantially even among the slits in the slit-type positive electrode current collector 28, and the sizes of the flowing current and the electrical resistance value are substantially even. It can also be understood from FIG. 13 showing the analysis results of the potential distribution obtained for the positive electrode connection edge portion 32 combined with the slit-type positive electrode current collector 28 that the current is flowing through a large number of orbits in the positive electrode connection edge portion 32, and the current substantially evenly flows in each orbit. Therefore, it can be stated that the electrical resistance value can be reduced when the slit-type positive electrode current collector 28 is used.

It can be understood from FIG. 14 showing the analysis results of the potential distribution of the porous positive electrode current collector 88 that the degree of change in gray between the lead welded portions 68 and the through holes 92 varies in each through hole. Therefore, it can be stated that the drop in potential is not even in each through hole in the porous positive electrode current collector 88, and the sizes of the flowing current and the electrical resistance value are non-uniform. It can also be understood from FIG. 15 showing the analysis results of the potential distribution obtained for the positive electrode connection edge portion 32 combined with the porous positive electrode current collector 88 that the current flows through only the orbits including the through holes 92 in the positive electrode connection edge portion 32, and the current does not evenly flow in each orbit. Therefore, it can be stated that when the porous positive electrode current collector 88 is used, the advantageous effect of reducing the electrical resistance value is smaller than when the slit-type positive electrode current collector 28 is used.

The electrical resistance value of the slit-type positive electrode current collector 28 is 0.0313 mΩ, and the electrical resistance value of the porous positive electrode current collector 88 is 0.0293 mΩ. The electrical resistance values at the parts of the positive electrode current collectors are substantially the same values in the slit type and the porous type. On the other hand, the electrical resistance value of the combined part of the positive electrode current collector and the positive electrode connection edge portion is 0.1164 mΩ, in the porous type and is 0.0884 mΩ, in the slit type. The electrical resistance value is lower in the slit type. Therefore, it can be understood that although there is no great difference between the electrical resistance values of the slit type and the porous type when only the positive electrode current collector is used, the electrical resistance value in the slit-type positive electrode current collector 28 is 24% smaller than the electrical resistance value in the porous positive electrode current collector 88 when the positive electrode current collector and the positive electrode connection edge portion are combined. This is advantageous in reducing the electrical resistance value. The slit-type positive electrode current collector 28 can come into contact with the positive electrode connection edge portion 32 at a large number of places, and the current can be relatively evenly applied across a relatively wide range. As a result, the electrical resistance value can be reduced, and this contributes to an improvement in the high-rate charge and discharge characteristics of the battery. In the slit-type positive electrode current collector 28, the length of the slits can be increased as much as possible to allow the slit-type positive electrode current collector 28 to come into contact with the positive electrode connection edge portion 32 at a larger number of places, and the electrical resistance value can be further reduced.

The present invention is not limited to the embodiment and Examples, and various modifications can be made. For example, the type of battery is not limited to the nickel-hydrogen secondary battery, and the battery may be a nickel-cadmium secondary battery or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cylindrical alkaline secondary battery comprising:
   a bottomed cylindrical outer can comprising a negative electrode terminal;
   a sealing body comprising a positive electrode terminal, the sealing body sealing an upper end opening of the outer can;
   a columnar electrode group formed by placing a positive electrode and a negative electrode on top of each other with a separator therebetween and spirally winding the positive electrode and the negative electrode, the electrode group housed in the outer can along with an alkaline electrolyte;

a current collector connected to an end edge portion of the positive electrode protruding from one end surface of the electrode group; and a current collecting lead connecting the current collector and the sealing body, wherein a relationship between a deformation resistance A of a material a and a deformation resistance B of a material b satisfies a relationship of A<B, wherein the material a is a material of the current collecting lead, and the material b is a material of the current collector.

2. The cylindrical alkaline secondary battery according to claim 1, wherein:

a thickness of the material b is thicker than a thickness of the material a to satisfy the relationship of A<B.

3. The cylindrical alkaline secondary battery according to claim 1, wherein:

a hardness of the material b is higher than a hardness of the material a to satisfy the relationship of A<B.

4. The cylindrical alkaline secondary battery according to claim 1, wherein:

the material a is pure Ni, and the material b is Ni-plated steel to satisfy the relationship of A<B.

5. The cylindrical alkaline secondary battery according to claim 1, wherein:

the current collecting lead comprises:

a rectangular top wall portion connected to the sealing body;

a side wall portion extending from a predetermined side edge of the top wall portion toward the current collector; and a leg portion provided on an end edge of the side wall portion and connected to the current collector; and a length of the side wall portion in a direction from the top wall portion toward the leg portion is equivalent to a length between the sealing body and the current collector.

6. The cylindrical alkaline secondary battery according to claim 5, wherein:

the side wall portion comprises a deformation promoting portion that promotes local deformation when compressive stress is applied in a direction in which the current collector and the sealing body approach with each other.

7. The cylindrical alkaline secondary battery according to claim 1, wherein:

the current collector comprises projections protruding toward the electrode group.

8. The cylindrical alkaline secondary battery according to claim 7, wherein:

the projections are burrs provided on notched edge portions formed on a plate surface of the current collector.

* * * * *